US006762812B2

United States Patent
Hasegawa et al.

(10) Patent No.: US 6,762,812 B2
(45) Date of Patent: Jul. 13, 2004

(54) LIQUID CRYSTAL DISPLAY AND METHOD FOR PRODUCING THE SAME

(75) Inventors: Rei Hasegawa, Yokohama (JP); Rieko Fukushima, Yokohama (JP); Tatsuo Saishu, Yokohama (JP); Hajime Yamaguchi, Yokohama (JP); Kohki Takatoh, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/610,535

(22) Filed: Jul. 2, 2003

(65) Prior Publication Data

US 2004/0004677 A1 Jan. 8, 2004

Related U.S. Application Data

(63) Continuation of application No. 09/801,812, filed on Mar. 9, 2001, now Pat. No. 6,614,491.

(30) Foreign Application Priority Data

Mar. 29, 2000 (JP) ......................................... 2000-91592

(51) Int. Cl.$^7$ ........................................... G02F 1/1337
(52) U.S. Cl. .......................... 349/132; 349/172; 345/97
(58) Field of Search ............................ 349/37, 42, 172, 349/191, 132; 345/97

(56) References Cited

U.S. PATENT DOCUMENTS

| | | | |
|---|---|---|---|
| 5,109,291 A | 4/1992 | Inaba | |
| 5,214,523 A | 5/1993 | Nito et al. | |
| 5,287,208 A | 2/1994 | Shimoto et al. | |
| 5,465,168 A | 11/1995 | Koden et al. | |
| 5,583,682 A | 12/1996 | Kitayama et al. | |
| 6,344,889 B1 | 2/2002 | Hasegawa et al. | |
| 6,614,491 B2 * | 9/2003 | Hasegawa et al. | ............ 349/37 |

FOREIGN PATENT DOCUMENTS

JP            2921577        4/1999

OTHER PUBLICATIONS

Asao et al., "Reflective Miniature Display Using Half–V Shaped Switching FLC Mode on the Bulk Silicon Substrate," Proceedings of AM–LCD 2000 (Jul. 2000), pp. 231–234.
Asao et al., "Novel Ferroelectric Liquid Crystal Mode for Active Matrix Liquid Crystal Display Using Cholesteric–Chiral Smectic C Phase Transition Material," Jpn. J. Appl. Phys. (1999), 38;5977–83.

* cited by examiner

Primary Examiner—Kenneth Parker
Assistant Examiner—David Chung
(74) Attorney, Agent, or Firm—Finnegan, Henderson, Farabow, Garrett & Dunner, L.L.P.

(57) ABSTRACT

There is provided a liquid crystal display which is capable of preventing light from leaking out from the peripheral portion of pixels and which has a high display performance. The liquid crystal display comprises: an array substrate including a plurality of scanning lines and a plurality of signal lines, a plurality of switching elements, a plurality of pixel electrodes, and a first alignment layer which is formed on the first substrate so as to cover the pixel electrodes; a counter substrate including a counter electrode and a second alignment layer which is formed on the second substrate so as to cover the counter electrode; and a light control layer sandwiched between the array substrate and the counter substrate, and including a liquid crystal material having a spontaneous polarization and having a nematic phase or an isotropic phase on a high-temperature side of a chiral smectic C phase, an optical axis of liquid crystal molecules in the light control layer substantially staying when no electric field or a first electric field of a first polarity are applied to said liquid crystal material, and the optical axis of the liquid crystal molecules responding in accordance with a magnitude of a second electric field of a second polarity different from the first polarity when the second electric field is applied to said liquid crystal material, wherein an electric field between the scanning lines and the counter electrode has the first polarity when the switching elements turn on.

10 Claims, 7 Drawing Sheets

SECTION TAKEN ALONG LINE A-A'

LIQUID CRYSTAL DISPLAY AND METHOD FOR PRODUCING THE SAME

This is a continuation of application Ser. No. 09/801,812, filed Mar. 9, 2001 now U.S. Pat. No. 6,614,491, which is incorporated herein by reference.

CROSS REFERENCE TO RELATED APPLICATION

This application claims benefit of priority under 35USC §119 to Japanese Patent Application No. 2000-91592, filed on Mar. 29, 2000, the contents of which are incorporated by reference herein.

BACKGROUND OF THE INVENTION

1. Field of the Invention

The present invention relates generally to a liquid crystal display using a liquid crystal having a spontaneous polarization, and a method for producing the same.

2. Description of Related Art

Liquid crystal displays have characteristics, such as low electric power consumption, light weight and thin type, and are widely used as monitors for personal computers and car navigation systems. However, as compared with CRTs, there are disadvantages in that the speed of response is slow, the viewing angle is narrow, and so forth. With the scale up and the higher resolution of liquid crystal displays, the requirements for a fast response and a wide angle of visibility are enhanced.

Liquid crystal displays using spontaneous polarization are widely noticed as a display mode capable of realizing a fast response. The spontaneous polarization is inherent in a liquid crystal, or induced by applying an electric field to the liquid crystal. Examples of such liquid crystal materials (display modes) include surface stabilized ferroelectric liquid crystal (SS-FLC), monostable ferroelectric liquid crystal, deformed helix ferroelectric liquid crystal (DHF), twisted ferroelectric liquid crystal (twisted FLC), alternating polarization domain (APD), polymer stabilized ferroelectric liquid crystal, anti-ferroelectric liquid crystal (including thresholdless anti-ferroelectric liquid crystal), and electroclinic effect.

In order to realize full-color displays by combining the above described display modes with active elements, it is desired that the switching of liquid crystal molecules does not produce domains. In International Conference on Ferroelectric Liquid Crystal (FLC 99) which was open in Germany on August 1999, the continuous director rotation (CDR) mode was reported. In this mode, it is possible to carry out a full-color half-tone display since the optical axes (long axes) of liquid crystal molecules continuously rotate in accordance with applied voltages.

In the CDR mode, a smectic phase is formed by applying a monopolar electric field (dc electric field) between pixel electrodes and a counter electrode during the phase transition of the liquid crystal material from the nematic phase or the isotropic phase to the chiral smectic C phase. At this time, although a desired monopolar electric field can be applied to a region in which the pixel electrodes face the counter electrode, a desired electric field can not be applied to a region outside of the pixel electrodes. Therefore, a uniform liquid crystal can not be obtained outside of the pixel region. After the inventors diligently studied, it was found that the following problem is caused because of ununiform alignment outside of the pixel region.

That is, if the liquid crystal is driven at room temperatures for 1000 hours or more or at a temperature of 10° C. or lower for 50 hours or more, the turbulence of alignment around the pixel region is propagated into pixels, so that light leakage occurs to lower contrast.

SUMMARY OF THE INVENTION

It is therefore an object of the present invention to eliminate the aforementioned problems and to provide a liquid crystal display which can prevent light from leaking out from the peripheral portion of pixels and which has a high display performance, and a method for producing the same.

In order to accomplish the aforementioned and other objects, according to one aspect of the present invention, a liquid crystal display comprises: an array substrate including a plurality of scanning lines and a plurality of signal lines, the scanning lines and the signal lines being formed on a first substrate in the form of a matrix, a plurality of switching elements which are formed at points of intersection between the scanning lines and the signal lines, one end of each of the switching elements being connected to a corresponding one of the signal lines, and each of the switching elements carrying out a switching action in response to a signal of a corresponding one of the scanning lines, a plurality of pixel electrodes, each of which is connected to the other end of a corresponding one of the switching elements, and a first alignment layer which is formed on the first substrate so as to cover the pixel electrodes; a counter substrate including a counter electrode which is formed on a second substrate, and a second alignment layer which is formed on the second substrate so as to cover the counter electrode; and a light control layer sandwiched between said array substrate and said counter substrate, and including a liquid crystal material having a spontaneous polarization and having a nematic phase or an isotropic phase on a high-temperature side of a chiral smectic C phase, an optical axis of liquid crystal molecules in said light control layer substantially staying when no electric field or a first electric field of a first polarity are applied to said liquid crystal material, and said optical axis of said liquid crystal molecules responding in accordance with a magnitude of a second electric field of a second polarity different from said first polarity when said second electric field is applied to said liquid crystal material, wherein an electric field between said scanning lines and said counter electrode has said first polarity when said switching elements turn on.

The switching elements may be disposed under said pixels.

A direction of a smectic layer in the light control layer preferably has a distribution of 10° or less.

If each of the switching elements has a negative TFT and if a smectic layer is formed by cooling the cell without the application of voltage, the first alignment layer has an alignment characteristic that the spontaneous polarization of liquid crystal molecules is directed to the first substrate when no voltage is applied to said liquid crystal material.

If each of the switching elements has a positive TFT and if a smectic layer is formed by cooling the cell without the application of voltage, the first alignment layer has an alignment characteristic that the spontaneous polarization of liquid crystal molecules is directed to the second substrate when no voltage is applied to said liquid crystal material.

According to another aspect of the present invention, there is provided a method for producing a liquid crystal display comprising an array substrate including a plurality of scanning lines and a plurality of signal lines, the scanning lines and the signal lines being formed on a first substrate in the form of a matrix, a plurality of switching elements which are formed at points of intersection between the scanning lines and the signal lines, one end of each of the switching elements being connected to a corresponding one of the signal lines, and each of the switching elements carrying out a switching action in response to a signal of a corresponding one of the scanning lines, a plurality of pixel electrodes, each of which is connected to the other end of a corresponding one of the switching elements, and a first alignment layer which is formed on the first substrate so as to cover the pixel electrodes; a counter substrate including a counter electrode which is formed on a second substrate, and a second alignment layer which is formed on the second substrate so as to cover the counter electrode; and a light control layer which is sandwiched between the array substrate and the counter substrate and which is made of a liquid crystal material having a spontaneous polarization and having a nematic phase or an isotropic phase on a high-temperature side of a chiral smectic C phase, the method comprising: forming a chiral smectic C phase with applying an electric field of a polarity between the pixel electrodes and the counter electrode when a phase transition of the liquid crystal material from a nematic phase or an isotropic phase to the chiral smectic C phase occurs, wherein said polarity of said electric field equals to a polarity of an electric field between the counter electrode and the scanning lines when the switching elements turn on.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below.

First Preferred Embodiment

Figure 1:
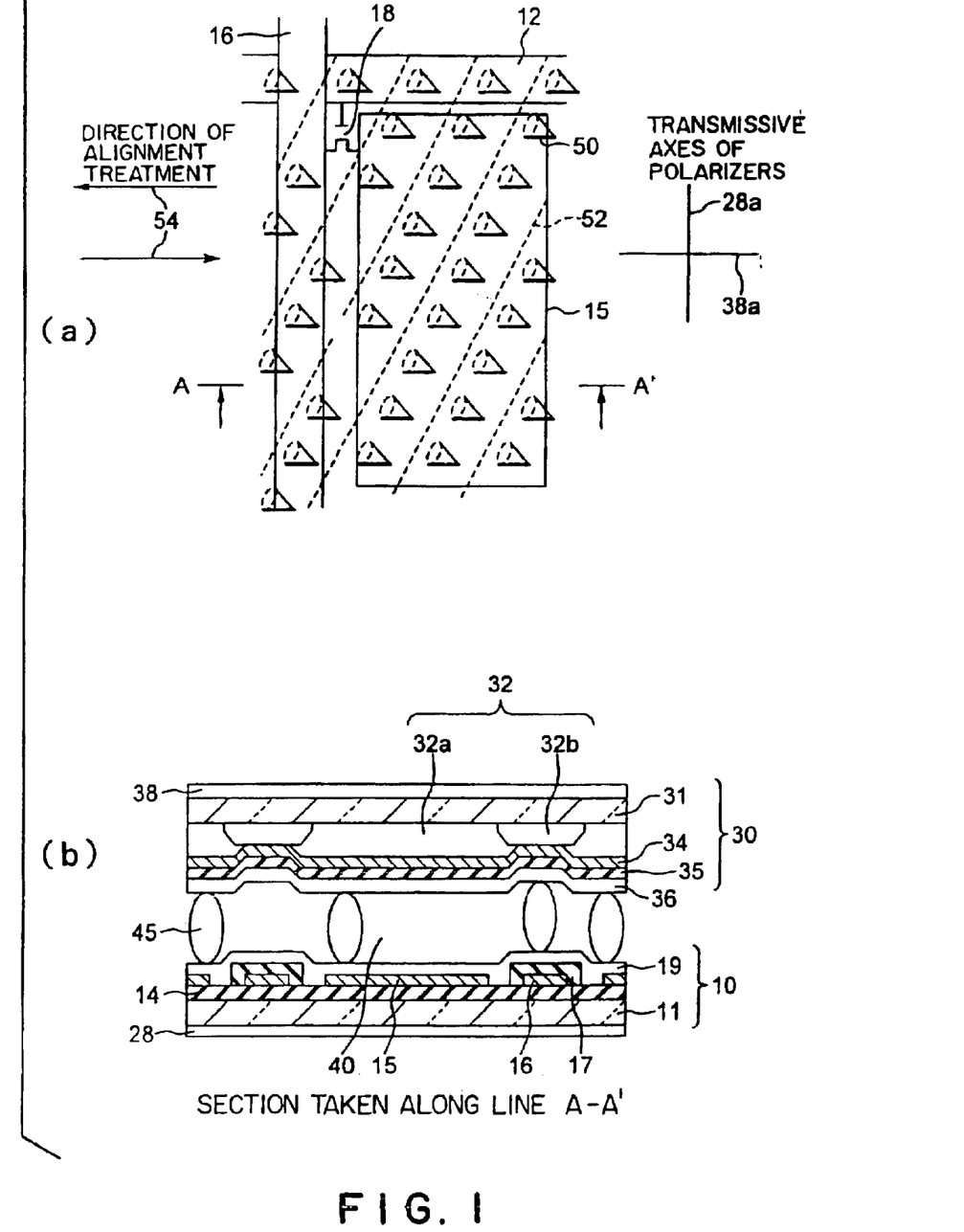
FIG. 1 is a schematic diagram showing the construction of the first preferred embodiment of a liquid crystal display according to the present invention.
Figure 2:
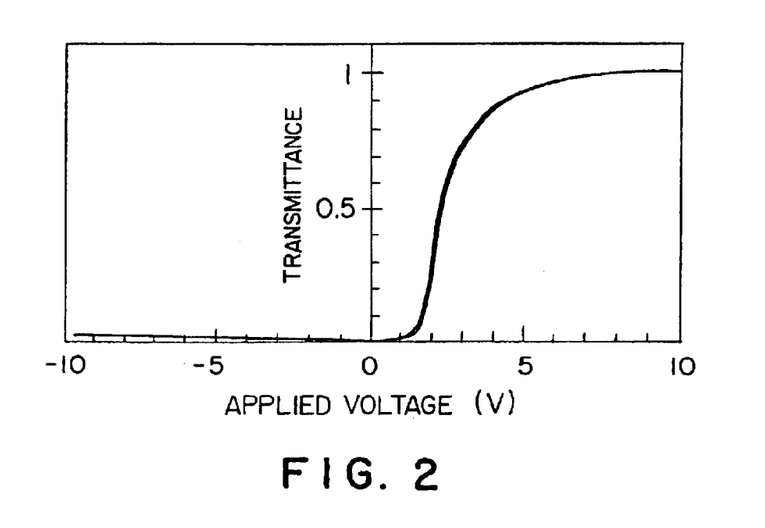
FIG. 2 is a graph showing the relationship between applied voltages and light transmittance in the first preferred embodiment.
Figure 3:
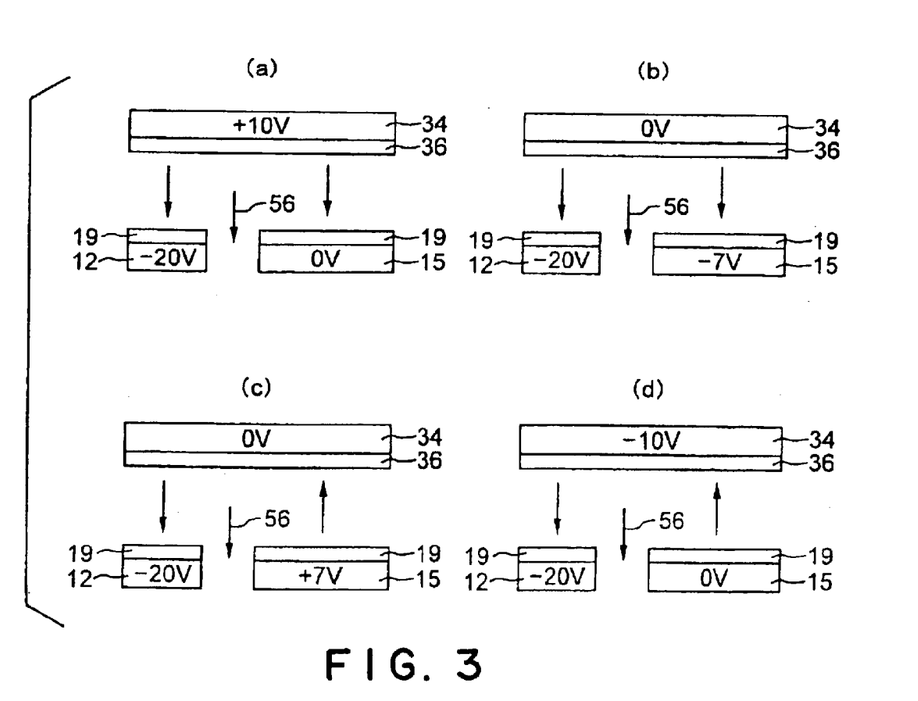
FIG. 3 is a schematic diagram for explaining advantages in the first preferred embodiment.

Referring to FIGS. 1 through 3, the first preferred embodiment of a liquid crystal display according to the present invention will be described below. The liquid crystal display in this preferred embodiment is an active matrix driving liquid crystal display.

FIG. 1(a) is a plan view of an active matrix driving liquid crystal display element in this preferred embodiment, and FIG. 1(b) is a sectional view taken along line A–A' of FIG. 1(a).

As shown in FIGS. 1(a) and 1(b), the liquid crystal display element in this preferred embodiment comprises an array substrate 10, a counter substrate 30, and a light control layer 40 of a liquid crystal material which is sandwiched between the substrates so as to have a predetermined thickness by spacers 45. This liquid crystal material has a nematic phase or an isotropic phase on the high temperature side of a chiral smectic C phase and has a spontaneous polarization.

The array substrate 10 has a transparent insulating substrate 11. On the principal surface of the substrate 11, a plurality of scanning lines (gate lines) 12 and auxiliary capacitive lines (not shown), which extend in one direction, are formed. A transparent insulating layer 14 is formed on the principal surface of the substrate 11 so as to cover the scanning lines 12 and the capacitor lines (see FIG. 1(b)). On the insulating layer 14, a plurality of pixel electrodes 15 of ITO (Indium Tin Oxide) are formed, and a plurality of signal lines 16 are formed so as to be substantially perpendicular to the scanning lines 12 (see FIGS. 1(a) and 1(b)). The signal lines 16 are covered with an insulating film 17 (see FIG. 1(b)). On the principal surface of the substrate 11 in the vicinity of the points of intersection between the scanning lines 12 and the signal lines 16, switching elements 18 of TFTs are formed. The gate of each of the switching elements 18 is connected to a corresponding one of the scanning lines 12. One terminal of the source and drain of each of the switching elements 18 is connected to a corresponding one of the signal lines 18 via a contact (not shown) provided in the insulating film 17, and the other terminal is connected to a corresponding one of the pixel electrodes 15 via a contact (not shown) provided in the insulating film 17.

An alignment layer 19 is formed on the principal surface of the substrate 11 so as to cover the pixel electrodes 15 and the switching elements 18. On the reverse surface of the substrate 11, a polarizer 28 is formed.

On the other hand, the counter substrate 30 is provided with a color filter portion 32. The color filter portion 32 comprises a color portion 32, formed in a pixel region on the principal surface of a transparent insulating substrate 31, for transmitting light beams having a specific wavelength, and black matrixes 32b which is formed in a non-pixel region on the principal surface of the transparent insulating substrate 31. On the display region of the color filter portion 32, a counter electrode 34 of ITO is formed. An alignment layer 36 is formed on the counter electrode 34 via an inorganic insulating film 35. The inorganic insulating film 35 is preferably provided in order to maintain insulating properties. On the reverse surface of the substrate 31, a polarizer 38 is formed.

The optical axis 28a of the polarizer 28 of the array substrate 10 and the optical axis 38a of the polarizer 38 of the counter substrate 30 are arranged so as to form a crossed Nicols configuration (see FIG. 1(a)).

In this preferred embodiment, alignment treatments, such as rubbing, are carried out on the alignment layers 19 and 38. For example, as shown in FIG. 1(a), an alignment treatment 54 is carried out on the alignment layer 19 of the array substrate 10 in directions of the gate lines 12. In FIG. 1(a), reference number 50 denotes liquid crystal molecules, and cones shown in FIG. 1(a) denote the locus of the liquid crystal molecules 50 when a voltage is applied.

A semiconductor thin film constituting the TFT 18 may be made of an amorphous silicon or a polysilicon. A polysilicon TFT using a polysilicon is suited to switch a liquid crystal having a spontaneous polarization since it has a high mobility. The polysilicon TFT can easily prepare a negative TFT. Furthermore, the negative TFT means a TFT, the gate of which is in ON state (low impedance) when the potential of the gate electrode is low compared with the potentials of the source electrode and the drain electrode. The amorphous silicon TFT is generally a positive TFT for production reasons.

If a leveling film is formed between the counter electrode 34 and the color filter portion 32, the counter electrode 34 is flattened, so that the alignment properties of the liquid crystal is improved and the counter electrode 34 and the array substrate 10 are difficult to be short-circuited.

The leveling film is preferably formed of any one of organic films, such as acrylic, polyimide, nylon, polyamide, polycarbonate, benzocyclobutene polymer, polyacrylonitrile and polysilane films. Acrylic films in view of costs, benzocyclobutene polymer films in view of planarization characteristics, and polyimide films in view of chemical stability are more preferred.

The switching element 18 may also be a thin film diode (TFD) element or the like, not the TFT element, if it can switch the corresponding pixel. The color filter may also be formed on the side of the array substrate.

The array substrate 10 and the counter substrate 30 are adhered to each other by a sealing material, which is applied on the non-display region, so that the alignment layers 19 and 36 face each other, except for a filling inlet (not shown). At this time, the distance between the array substrate 10 and the counter substrate 30 is held to be a predetermined distance by means of the spacers 45.

The liquid crystal material 40 is introduced by a filling process for introducing the liquid material 40 via the filling inlet after the interior of the cell is evacuated. The filling inlet is completely sealed by a saling material (not shown) after filling the liquid crystal material, and isolated from the outside air.

In the liquid crystal cell thus formed, the liquid crystal 40 is heated to the isotropic phase or the nematic phase. Then, the liquid crystal 40 is cooled to cause the phase transition of the liquid crystal 40 from the nematic phase to the chiral smectic C phase. At this time, a monopolar electric field is applied between the counter electrode 34 and the pixel electrode 15 on the basis of the potential of the counter electrode 24. By thus forming the chiral smectic C phase, it is possible to uniformly orient the liquid crystal molecules 50 sandwiched between the counter electrode 34 and the pixel electrode 15. As shown in FIG. 1(b), when no voltage is applied, the molecular orientation of the liquid crystal is substantially parallel to the rubbing direction.

As shown in FIG. 2, in the voltage-transmittance characteristics, when the above described monopolar electric field is applied, the major axes of the liquid crystal molecules 50 hardly vary to be arranged substantially at the same position as that when no voltage is applied, and when the opposite polar electric field to the above described monopolar electric field is applied, the major axes of the liquid crystal molecules 50 vary in accordance with the magnitude of the electric field.

After the inventors diligently studied, it was found that the following embodiments were preferred according to the present invention.

Assuming that the chiral pitch of the liquid crystal 40 is p and the distance between the array substrate 10 and the counter substrate 30 is d, it is preferred that d<p. If d<p, it is possible to prevent the liquid crystal from having a twisted structure. If the liquid crystal 40 has the twisted structure, the light passing increases when no voltage is applied, and the contrast of the liquid crystal display is lowered.

In the working temperature range (usually 0° C.~50° C. ) of the liquid crystal display, when the apparent tilt angle (actually measured tilt angle) of the liquid crystal molecules 50 is 22.5° or more, the angle between the optical axis of the liquid crystal and the transmission angle of the polarizer is 45° or more when the spontaneous polarization is reversed by the application of voltage, consequently the transmittance becomes maximum. Therefore, in order to obtain a high contract liquid crystal display, the apparent tilt angle of the liquid crystal molecules 50 is preferably about 22.5° or more.

As the materials of the alignment layer for use in the liquid crystal display in this preferred embodiment, there may be used organic films, such as acrylics, polyimides, polyamides, polycarbonates, polyacrylonitriles, polysilanes, polyamic acids, polyetheramides, polyamideimides, nylons, and benzocyclobutene polymers, and obliquely evaporated silicon oxides. In view of the facility of formation and chemical stability, polyimides and polyacrylonitriles are particularly preferred.

If the alignment layer is made of a polyimide, the polyimide preferably has a relatively low polarity (relatively strong hydrophobic property). For example, such polyimides include polyimides having imidizing rate of 85% or more, polyimides containing fluorine atoms ($CF_3$ group), polyimides having a benzene ring at acid anhydride portions thereof, polyimides having no oxygen atoms (ether linkages) at diamine portions thereof, and polyimides having —$CH_2$— bonds at diamine portions thereof. The reason why polyimides having relatively low polarities are suitable for the present invention will be described below.

When the smectic phase appears, the polarity surface interaction between the liquid crystal molecules 50 and the alignment layer applies force so that the spontaneous polarization of the liquid crystal molecules 50 is directed to the outside (or inside) (whether outside or inside is determined by the electron affinity of alignment layer). When this force collides with the dc voltage applied between the counter electrode 34 and the pixel electrode 15 (for example, when the spontaneous polarization is oriented to the inside by the dc voltage although the spontaneous polarization is intended to be directed to the outside by the polarity surface interaction on the interface of the array substrate 10), the degree of orientation of the liquid crystal lowers. In order to prevent this, the polarity surface interaction should be small. Since the polarity surface interaction between the polyimide alignment layer and the liquid crystal is small as the polarity of the polyimide alignment layer is small, low polarity polyimides are suitable for a liquid crystal display according to the present invention.

With respect to the alignment layers suitable for the present invention, their materials and rubbing conditions for applying a relatively low pretilt angle (4° or less) to the liquid crystal are preferred. The reason for this is that as the pretilt angle decreases, the anchoring force between the liquid crystal molecules and the surface of the alignment layer increases, so that the orientation of the liquid crystal can be more uniform. The rubbing directions of the array substrate 10 and the counter substrate 30 are preferably anti-parallel rather than parallel to each other. The anti-parallel rubbing more easily provides a bookshelf structure or a tilted bookshelf structure. As a result, there are no region of alignment defects such as zigzag defects, so that good alignment characteristics can be obtained.

When the smectic layer 52 is formed, the dc voltage or offset voltage to be applied to the cell is preferably in the range of from 0.2 V to 10 V. Because there are some cases where the spontaneous polarization is not directed in one direction if the voltage is less than 0.2 V, and there are some cases where ionic impurities contained in the liquid crystal 40 are absorbed onto the surface of the alignment layer to cause image sticking defects if the voltage is higher than 10 V when the smectic layer 52 is formed if the voltage is higher than 10 V.

When the smectic layer 52 is formed, the following method for applying a dc voltage is preferred. Referring to FIG. 3, assuming that the reference potential of the signal lines (Vsig, center) is 0 V, this method will be described below. Generally, the maxim voltage capable of being applied to the signal lines 16 is only ±7 V due to the withstand voltage of the driver IC. Although there is no limit to the voltage applied to the counter substrate 34, the voltage is preferably 10 V or less as described above. In FIG. 3, there is used an example of the gate voltage applied to the gate lines 12 when the TFT 18 is turned on, and it is assumed that the gate voltage is −20 V in the case of a negative TFT. In a case where a polyimide film is used as the alignment layer, liquid crystal molecules tend to be oriented so that the spontaneous polarization 56 of the liquid crystal molecules 50 is directed to the outside of the substrate by the polarity surface interaction (electroclinic effect) between the polyimide alignment layer and the liquid crystal material 40 unless the external electric field is applied when the smectic C phase is formed. As shown in FIGS. 3(a) through 3(d), voltages are applied to the crystal sandwiched between the signal lines and the counter electrode and between the pixel electrodes and the counter electrode. But, since there is no electrode between the gate lines and the pixel electrodes, no electric field is applied to the crystal sandwiched between a portion, wherein no electrode is provided between the gate lines and the pixel electrodes, and the counter electrode when the smectic C phase is formed. Therefore, the spontaneous polarization 56 is directed to the array substrate as described above. In FIGS. 3(a) and 3(b), the direction of the electric field is the same as this direction, and the light leakage in the peripheral portion of the pixels is minimum as compared with other cases shown in FIGS. 3(c) and 3(d). Therefore, in a case where the polyimide alignment film is used, the negative TFT is preferably used, and the voltage is preferably applied in accordance with the relationship of voltage shown in FIG. 3(a) or 3(b). Moreover, when a high voltage is applied, the voltage is preferably applied in accordance with the relationship shown in FIG. 3(a). Furthermore, if the TFT 18 is a positive TFT in this preferred embodiment, the direction of the spontaneous polarization 56 of the liquid crystal sandwiched between a portion, wherein no electrode is provided between the gate lines and the pixel electrodes, and the counter electrode is different from the direction of the electric field, so that the light leakage in the peripheral portion of the pixels is greater than that in this preferred embodiment.

If the completed liquid crystal display is observed by a microscope or the like while it is driven, it is possible to confirm the presence of light leakage in the vicinity of the gate lines 12. Moreover, if the output of the driver IC is monitored by a probe or the like, it can be determined if the electric field, which is caused between the gate lines 12 and the counter electrode 34 when the switching element 18 is turned on, has the same polarity as that of the electric field on the side wherein the axes of the liquid crystal molecules 50 hardly vary.

As described above, according to this preferred embodiment, it is possible to prevent light from leaking out from the peripheral portion of the pixels, so that it is possible to obtain a liquid crystal display having a high display performance.

A method for producing the first preferred embodiment of a liquid crystal display according to the present invention will be described below.

First, TFT element 18s are formed on a glass substrate 11 as follows.

Capacitor lines of chromium (not shown) and gate lines 12 were formed on the glass substrate 11. The capacitor lines and the gate lines 12 were covered with an insulating film 14 having a stacked structure comprising a chromium oxide film and a silicon oxide film, and a semiconductor layer (not shown) of amorphous silicon was patterned on the insulating film 14. On the semiconductor layer, a channel protective layer (not shown) of silicon nitride was formed. On the semiconductor layer and the channel protective layer, source electrodes electrically connected to the semiconductor layer via a ohmic layer, and drain electrodes integral with signal lines 16 were formed. Moreover, pixel electrodes 15 electrically connected to the source electrodes were formed. Thus, the TFT elements 18, the signal lines 16, the gate lines 12 and the pixel electrodes 15 are formed on the glass substrate 11.

In order to prevent the short-circuit to the counter electrode 34, the TFT elements 18, the-signal lines 16, the gate lines 12 and the pixel electrodes 15 were covered with a silicon oxide film (not shown) having a thickness of 100 nm.

A color filter 32a and a counter electrode 34 were formed on the glass substrate 31 as follows.

By patterning a chromium film on the glass substrate 31, a black matrix 32b was formed. A color filter film of a photosensitive acrylic resin, in which pigments of red, green and blue were mixed, was formed thereon. Moreover, a transparent acrylic resin was applied thereon as a leveling film (not shown). On the leveling film, a counter electrode 34 of ITO was formed by sputtering.

After the array substrate on which the TFT elements 18 have been formed, and the counter substrate on which the counter electrode 34 has been formed were cleaned, a polyimide solution (SE-5291 produced by Nissan Chemical Industries, Ltd., γp: 6 dyn/cm) was applied on these substrate by the offset printing. Using hot plate, this was burned at 90° C. for 1minute, and then, at 180° C. for 10 minutes to provide alignment layers 19 and 36.

Then, a rubbing treatment was carried out on the alignment layers 19 and 36 on the array substrate 10 and counter substrate 30 by using of cloth of cotton. The rubbing direction is shown in FIG. 1(a). A rubbing cloth of cotton having piles having a diameter of 0.1 to 10 microns was used. As rubbing conditions, the revolving speed of a rubbing roller was 500 rpm, the moving speed of the substrate was 20 mm/s, the pushing depth was 0.7 mm, and the number of rubbing operations was one.

After the rubbing, the alignment layers 19 and 36 on the array substrate 10 and counter substrate 30 were cleaned with an aqueous solution containing a neutral surfactant as a principal component, to remove contamination adhering to the alignment layers from the rubbing cloth.

Then, spacer particles 45 (diameter: 2.0 μm) of silicon oxide ($SiO_2$) were distributed on alignment layer 19 of the array substrate 10. In addition, a sealing material of an epoxy resin was printed on the peripheral portion of the counter substrate 30 by means of a dispenser.

The surfaces of the array substrate 10 and counter substrate 30, on which the alignment layers were formed, were directed inside to face each other. The array substrate 10 and the counter substrate 30 were aligned, and the sealing material was heated to 160° C. in a pressurized state to be cured to form a cell. Furthermore, the rubbing directions on the array substrate 10 and counter substrate 30 were anti-parallel to each other.

After this cell was put in a vacuum chamber to be in vacuum, a ferroelectric liquid crystal composition 40 (phase series: solid phase→30° C.→chiral smectic C phase→80° C.→nematic phase→85°C.→isotropic phase, tilt angle at 30° C.: 22.5°, spontaneous planarization: −7 nC/cm$^2$) was injected into the cell via a filling inlet. However, when the liquid crystal was injected, the cell and the liquid crystal 40 were heated to 100° C. Thereafter, the filing inlet was sealed with an epoxy adhesive.

Then, the extracted portions of the signal lines 16, gate lines 12, capacitor lines and counter electrode 34 of the cell filled with the liquid crystal 40 were connected to terminals, to which voltages are to be applied, via an anisotropic conductive film. Then, the cell was heated to 90° C. in an oven. A voltage of −20 V was applied to the gate lines 12 to cause the TFT elements 18 to be always in ON state, and a voltage of 0 V was applied to the signal lines 16 to hold the pixel electrode 15 at 0 V. In addition, a voltage of 0 V was applied to the capacitor lines, and a voltage of +8 V was applied to the counter electrode 34. While these voltages are applied, the cell was cooled from 90° C. to 25° C. at a rate of 1° C./min to form a smectic layer 52.

After this cell was observed by a polarizing microscope, the smectic layer 52 was the same as that shown in FIG. 1(a).

After the gap of this cell was measured, it was 2.0 μm. The chiral pitch of the liquid crystal used in this preferred embodiment was 4.0 μm which was longer than the cell gap. Therefore, the liquid crystal did not have a twisted alignment.

Then, a set of polarizer 28 and 38 were applied on the outside of the cell. Furthermore, the transmitting axis of one polarizer 38 was parallel to the optical axis of the liquid crystal molecules 50 when no voltage was applied, and the transmitting axis of the other polarizer 28 was perpendicular to the optical axis of the liquid crystal molecules 50 when no voltage was applied. On the cell on which the polarizers were applied, a driving circuit, such as a driver IC, was mounted, and a back light and so forth were mounted to complete a liquid crystal display in this preferred embodiment.

In this case, since the direction of the spontaneous polarization of the liquid crystal of portions between the gate lines 16 and the pixel electrodes 15 and between the signal lines 16 and the pixel electrodes 16 were the same as that of the liquid crystal sandwiched between the pixel electrodes and the counter electrode, light was hardly leaked out from the non-pixel portion, so that it was possible to obtain a contrast of 300:1. In addition, the viewing angle (a region having a contrast of 10:1 or more and no reversal of gray scales) was 70° or more in vertical and horizontal directions, and the alignment characteristics and contrast were not deteriorated after driving tests at 0° C., 25° C. and 50° C. for 3000 hours. While the spacers have been distributed in this preferred embodiment, post-like or wall-like spacing means may be formed on the alignment layer by a photolithography process in place of the spacers. In this case, the spacing means is preferably formed on the gate lines so that the alignment defects caused by the rubbing can be hidden with the gate lines.

Second Preferred Embodiment

Figure 4:
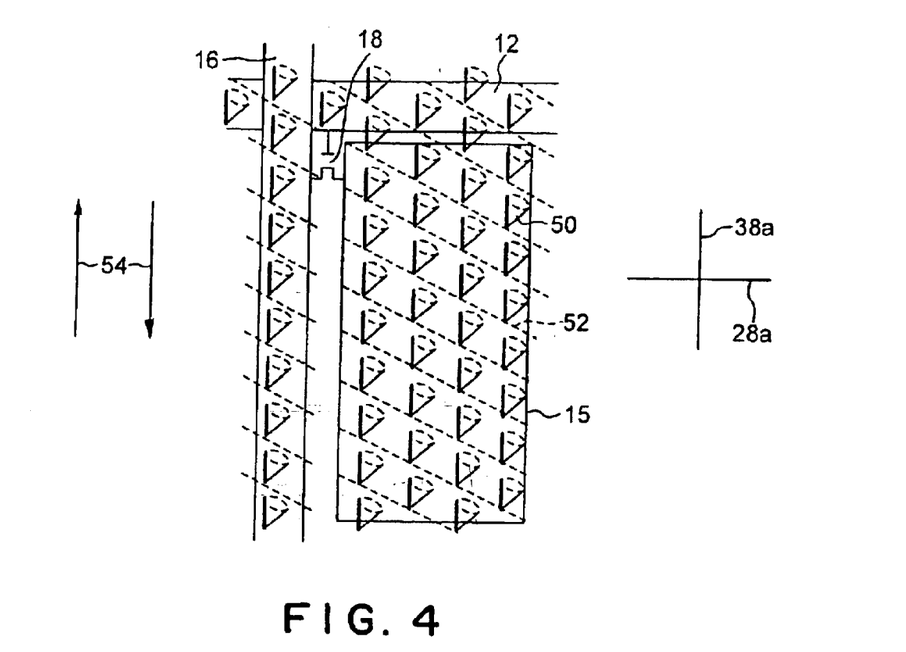
FIG. 4 is a schematic diagram showing the construction of the second preferred embodiment of the present invention.

Referring to FIG. 4, the second preferred embodiment of a liquid crystal display according to the present invention will be described below. In this second preferred embodiment, a rubbing direction 54 and the transmitting axes of polarizers 28 and 38 are different from those in the first preferred embodiment shown in FIG. 1. Other constructions are the same as those in the first preferred embodiment. In the second preferred embodiment, the rubbing direction 54 is substantially anti-parallel to signal lines 16. The transmitting axis 38a of the polarizer 38 is parallel to the signal lines 16.

After the liquid crystal display in this preferred embodiment was actually produced and its performance was measured, it was possible to obtain the same performance as that in the first preferred embodiment.

Third Preferred Embodiment

Figure 5:
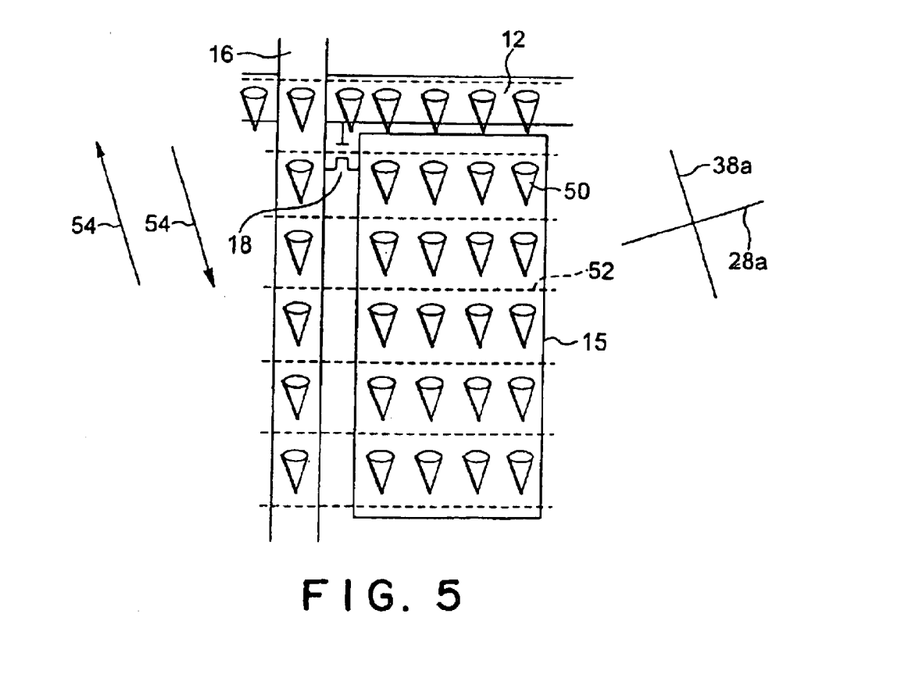
FIG. 5 is a schematic diagram showing the construction of the third preferred embodiment of the present invention.

The construction of the third preferred embodiment of a liquid crystal display according to the present invention is shown in FIG. 5. In this third preferred embodiment, a rubbing direction 54 and the transmitting axes 28a and 38a of polarizer 28 and 38 are different from those in the first preferred embodiment shown in FIG. 1. Other constructions are the same as those in the first preferred embodiment.

In the third preferred embodiment, there is a predetermined angle θ (0<θ<90°) between the rubbing direction 54 and gate lines 12, and there is a predetermined angle θ between the transmitting axis 38a of the polarizer 38 and the gate lines 12. In this preferred embodiment, the rubbing direction was determined so as to form a layer substantially parallel to the gate lines.

After the liquid crystal display in this preferred embodiment was actually produced and its performance was measured, it was possible to obtain the same performance as that in the first preferred embodiment.

Fourth Preferred Embodiment

Figure 10:
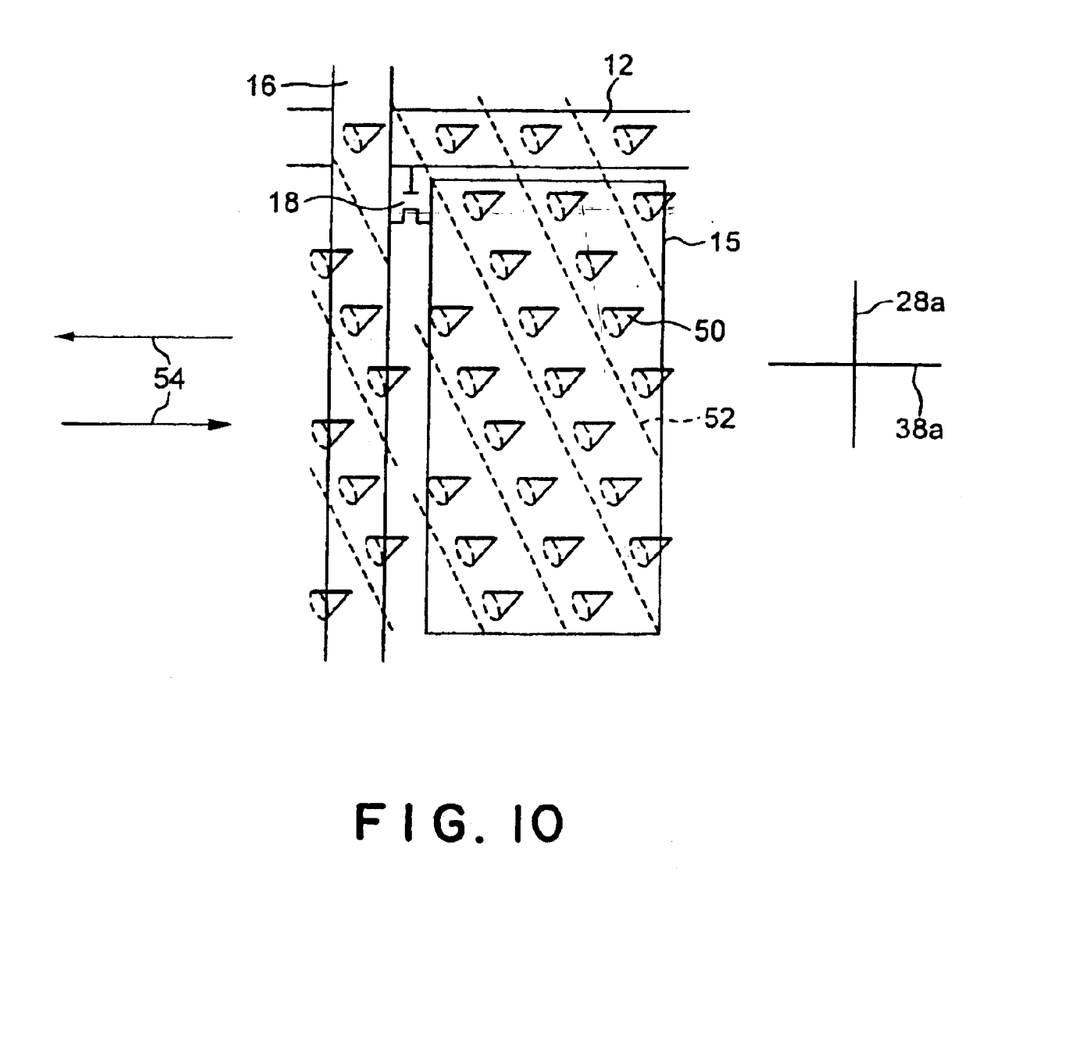
FIG. 10 is a schematic diagram showing the construction of the fourth preferred embodiment of the present invention.

The construction of the fourth preferred embodiment of a liquid crystal display according to the present invention is shown in FIG. 10. In the liquid crystal display in this fourth preferred embodiment, TFTs constituting switching elements 18 are positive TFTs in place of the negative TFTs of the liquid crystal display in the first preferred embodiment. Therefore, for reasons which will be described later, alignment layers 19 and 36 are made of a nylon. Furthermore, a benzocyclobutene polymer may be used in place of the nylon.

The liquid crystal display in the fourth preferred embodiment is formed as follows.

The above described material was used for forming a cell filled with the liquid crystal, in the same manner as that in the first preferred embodiment.

Figure 6:
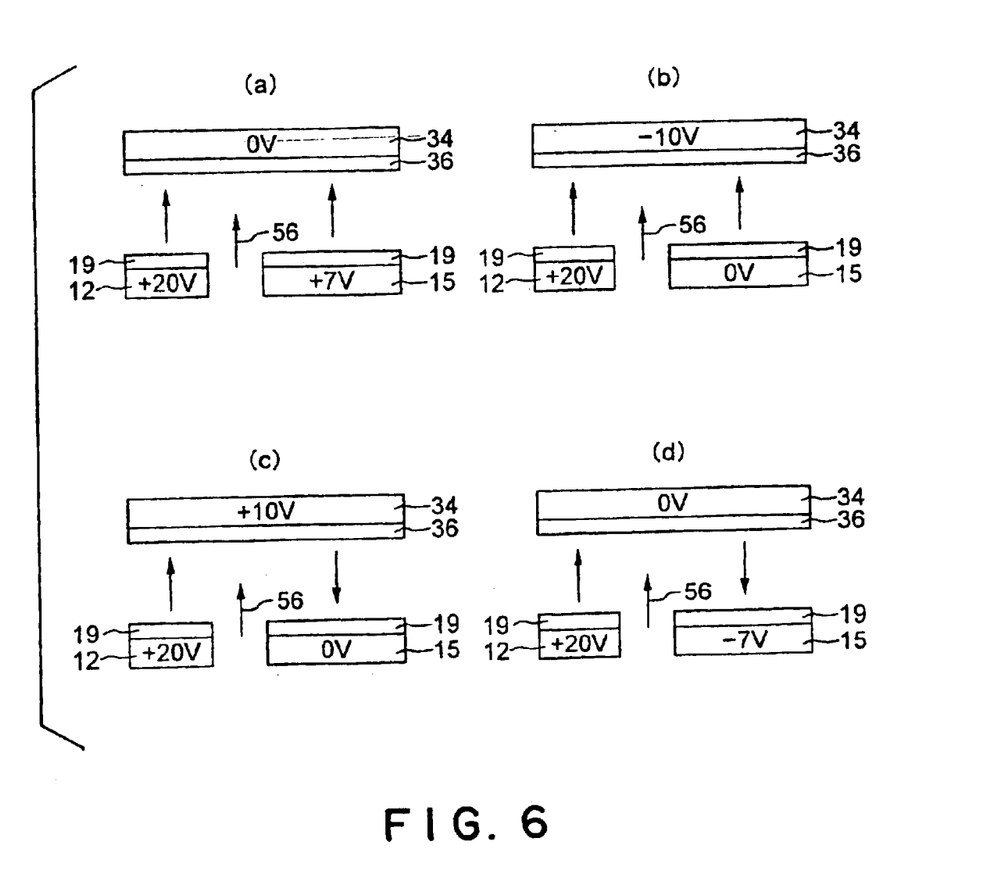
FIG. 6 is a schematic diagram for explaining advantages in the fourth preferred embodiment of the present invention.

Then, the extracted portions of the signal lines 16, gate lines 12, capacitor lines and counter electrode 34 of the cell filled with the liquid crystal 40 were connected to terminals, to which voltages are to be applied, via an anisotropic conductive film. Then, the cell was heated to 90° C. in an oven. As shown in FIG. 6(a), a voltage of +20 V was applied to the gate lines 12 to cause the TFTs 18 to be always in ON state, and a voltage of +7 V was applied to the signal lines 16 to hold the pixel electrode 15 at +7 V. In addition, a voltage of +7 V was applied to the capacitor lines, and a voltage of 0 V was applied to the counter electrode 34. While these voltages are applied, the cell was cooled from 90° C. to 25° C. at a rate of 1° C./min to form a smectic layer 52.

After this cell was observed by a polarizing microscope, the smectic layer 52 was the same as that shown in FIG. 10.

After the gap of this cell was measured, it was 2.0 μm. The chiral pitch of the liquid crystal 40 used in this preferred embodiment was 4.0 μm which was longer than the cell gap. Therefore, the liquid crystal did not have a twisted alignment.

Then, a set of polarizer 28 and 38 were applied on the outside of the cell. Furthermore, the transmitting axis 38a of or polarizer 38 was parallel to the optical axis of the liquid crystal molecules 50 when no voltage was applied, and the transmitting axis 28a of the other polarizer 28 was perpendicular to the polarizer 38. On the cell on which the polarizers were applied, a driving circuit, such as a driver IC, was mounted, and a back light and so forth were mounted to complete a liquid crystal display in this preferred embodiment.

This liquid crystal display hardly leaks light out from the vicinity of the gate lines, so that it was possible to obtain a front contrast of 300:1. In addition, the viewing angle (a region having a contrast of 10:1 or more and no reversal of gray scales) was 70° or more in vertical and horizontal directions, and the alignment characteristics and contrast were not deteriorated after driving tests at 0° C., 25° C. and 50° C. for 3000 hours.

In the fourth preferred embodiment, since the alignment layers 19 and 36 are made of a nylon or a benzocyclobutene polymer, the polarity surface interaction (electroclinic effect) between the alignment layer and the liquid crystal material tends to orient the liquid crystal molecule 50 so that the spontaneous polarization 56 of the liquid crystal molecules 50 is directed to the inside. Therefore, when the smectic layer 52 is formed, if voltages of +20 V, +7 V and 0 V are applied to the gate electrodes 12, the pixel electrodes and the counter electrode 34, respectively, as this preferred embodiment, the spontaneous polarization 56 of the liquid crystal molecules 50 is oriented so as to be parallel to the direction of the electric field as shown in FIG. 6(a), so that the quantity of light leaking out from the peripheral portion of the pixels can be decreased as small as possible. When the smectic layer is formed, even if voltages of +20 V, 0 V and −10 V are applied to the gate electrodes, the pixel electrodes and the counter electrode, respectively, as shown in FIG. 6(b), the spontaneous polarization 56 of the liquid crystal molecules 50 is oriented in the direction of the electric field, so that the same advantages can be obtained.

Furthermore, when the smectic layer is formed, if the voltages are applied so that the direction of the spontaneous polarization 56 of the liquid crystal molecules 50 is different from the direction of the electric field as shown in FIGS. 6(c) and 6(d), the quantity of light leaking out from the peripheral portion of the pixels is larger than those shown in FIGS. 6(a) and 6'(b).

As described above, in this preferred embodiment, it is possible to prevent light from leaking out from the peripheral portion of the pixels, so that it is possible to obtain a liquid crystal display having a high display performance.

Furthermore, in this preferred embodiment, if the TFTs 18 are negative TFTs, the direction of the spontaneous polarization 56 of the liquid crystal molecules 50 is different from the direction of the electric field, so that the quantity of light leaking out from the peripheral portion of the pixels is larger than that in this preferred embodiment.

Fifth Preferred Embodiment

The fifth preferred embodiment of a liquid crystal display according to the present invention will be described below. The liquid crystal-display in this fifth preferred embodiment has the same construction as that of the liquid crystal display in the fourth preferred embodiment, except that the liquid crystal material is different.

In the same manner as that in the fourth preferred embodiment, an empty cell was formed. After this cell was put in a vacuum chamber to be in vacuum, A 10:1 mixture of a ferroelectric liquid crystal composition 40 (phase series: solid phase→30° C.→chiral smectic C phase→75° C.→nematic phase→80° C.→isotropic phase, tilt angle: 22.5°, spontaneous planarization: 3 nC/cm$^2$) and a UV-curable liquid crystal (UCL-001 produced by DAINIPPON INK & CHEMICALS, INC.) was injected into the cell via a filling inlet. At this time, the cell and the liquid crystal 40 were heated to 85° C. Thereafter, the filing inlet was sealed with an epoxy adhesive.

Then, the extracted portions of the signal lines 16, gate lines 12, auxillary capacitive lines and counter electrode 34 of the cell filled with the liquid crystal 40 were connected to terminals, to which voltages are to be applied, via an anisotropic conducive film. Then, the cell was heated to 77° C. in an oven. A voltage of +25 V was applied to the gate lines 12 to cause the TFT elements 18 to be always in ON state, and a voltage of +7 V was applied to the signal lines 16 to hold the pixel electrode 15 at +7 V. In addition, a voltage of +7 V was applied to the capacitor lines, and a voltage of 0 V was applied to the counter electrode 34. While these voltages are applied, the cell was cooled from 77° C. to 73° C. at a rate of 1° C./min to form a smectic layer 52. In this state, the cell was irradiated with UV light (365 nm, 10 mJ/cm$^2$) to cure the UV-curable liquid crystal. Thereafter, no voltage was applied, and the cell was cooled at a rate of 10° C./min.

After this cell was observed by a polarizing microscope, the smectic layer 52 was the same as that shown in FIG. 10.

After the gap of this cell was measured, it was 2.0 μm. The chiral pitch of the liquid crystal used in this preferred embodiment was 4.0 μm which was longer than the cell gap. Therefore, the liquid crystal did not have a twisted alignment.

Then, a set of polarizers 28 and 38 were applied on the outside of the cell. Furthermore, the transmitting axis 38a of one polarizer 38 was parallel to the optical axis of the liquid crystal molecules 50 when no voltage was applied, and the transmitting axis 28a of the other polarizer 28 was perpendicular to the transmitting axis 38a. On the cell on which the polarizers were applied, a driving circuit, such as a driver IC, was mounted, and a back light and so forth were mounted to complete a liquid crystal display in this preferred embodiment.

This liquid crystal display did not leak light out from the vicinity of the gate lines 12, so that it was possible to obtain a contrast of 200:1. In addition, the viewing angle(a region having a contrast of 10:1 or more and no reversal of gray scales) was 70° or more in vertical and horizontal directions, and the liquid crystal alignment and the contrast were not deteriorated after driving tests at 0° C., 25° C. and 50° C. for 3000 hours.

In the fifth preferred embodiment, it is possible to obtain the same advantages as those in the fourth preferred embodiment.

Comparative Example

Figure 7:
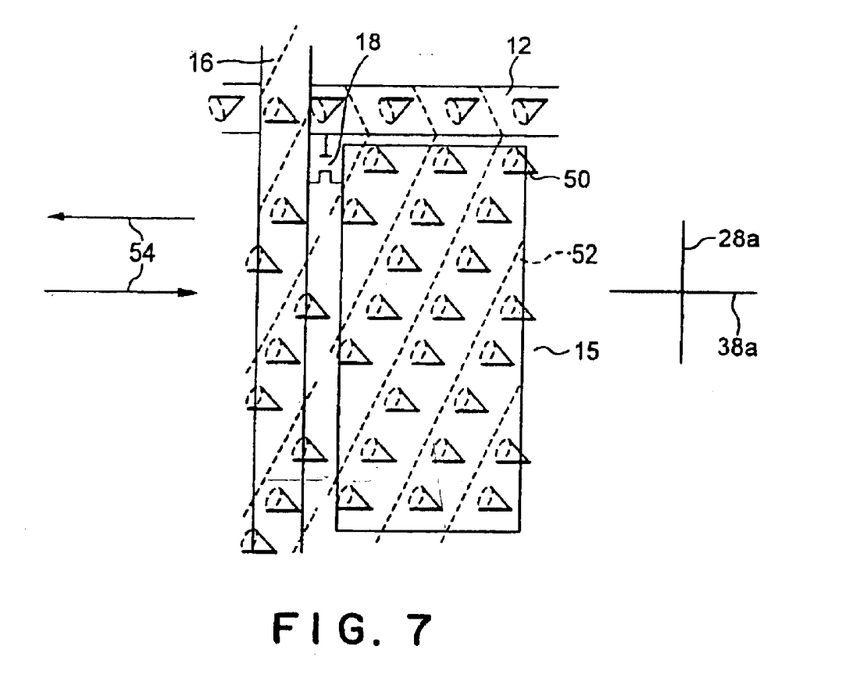
FIG. 7 is a schematic diagram showing a comparative example of the fourth preferred embodiment.

Referring to FIG. 7, a comparative example with the liquid crystal display in the fourth preferred embodiment will be described below.

First, a cell was formed in the same manner as that in the fourth preferred embodiment.

Then, the extracted portions of the signal lines 16, gate lines 12, capacitor lines and counter electrode 34 of the cell filled with the liquid crystal 40 were connected to terminals, to which voltages are to be applied, via an anisotropic conductive film. This cell was heated to 90° C. in an oven. A voltage of +20 V was applied to the gate lines 12 to cause the TFT elements 18 to be always in ON state, and a voltage of 0 V was applied to the signal lines 16 to hold the pixel electrode 15 at 0 V. In addition, a voltage of +0 V was applied to the capacitor lines, and a voltage of +7 V was applied to the counter electrode 34. While these voltages are applied, the cell was cooled from 90° C. to 25° C. at a rate of 1° C./min to form a smectic layer 52.

After this cell was observed by a polarizing microscope, the smectic layer 52 was the same as that shown in FIG. 7. That is, the direction of the smectic layer on the gate lines is greatly different from that on the pixel electrodes, so that the smectic layer is bent.

After the gap of this cell was measured, it was 2.0 μm. The chiral pitch of the liquid crystal used in this comparative example was 4.0 μm which was longer than the cell gap. Therefore, the liquid crystal did not have a twisted alignment.

Then, a set of polarizers 28 and 38 were applied on the outside of the cell. Furthermore, the transmitting axis 38a of one polarizer 38 was parallel to the optical axis of the liquid crystal molecules 50 when no voltage was applied, and the transmitting axis 28a of the other polarizer 28 was perpendicular to the transmitting axis 38a. On the cell on which the polarizers were applied, a driving circuit, such as a driver IC, was mounted, and a back light and so forth were mounted to complete a liquid crystal display in this comparative example.

This liquid crystal display leaked light out from the vicinity of the gate lines (between the gate lines and the pixel electrodes), so that the contrast was 50:1. In a driving test at 0° C., the alignment was disturbed after 50 hours, and the contrast was lowered to 25:1.

Sixth Preferred Embodiment

Figure 8:
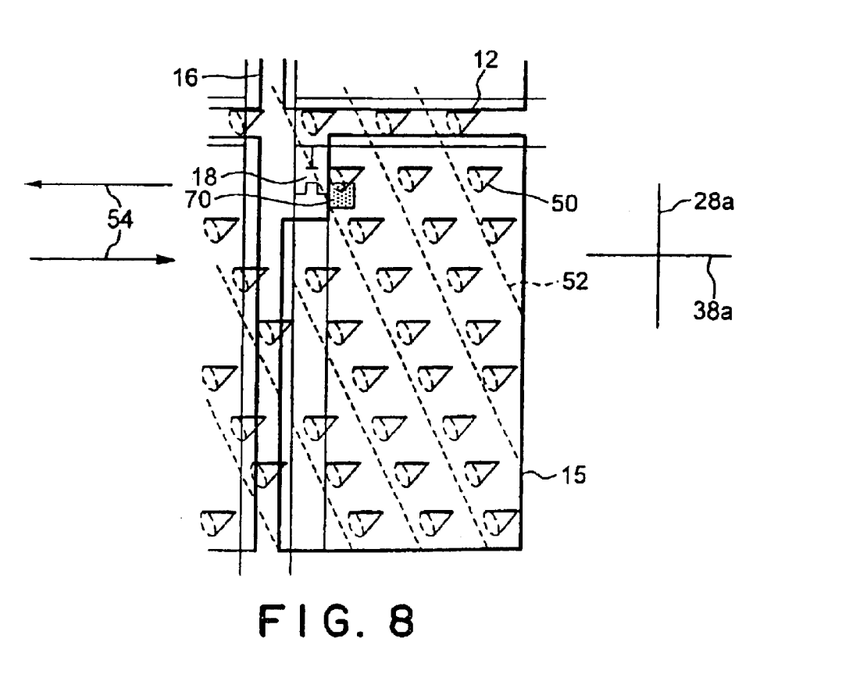
FIG. 8 is a schematic diagram showing the construction of the sixth preferred embodiment of the present invention.
Figure 9:
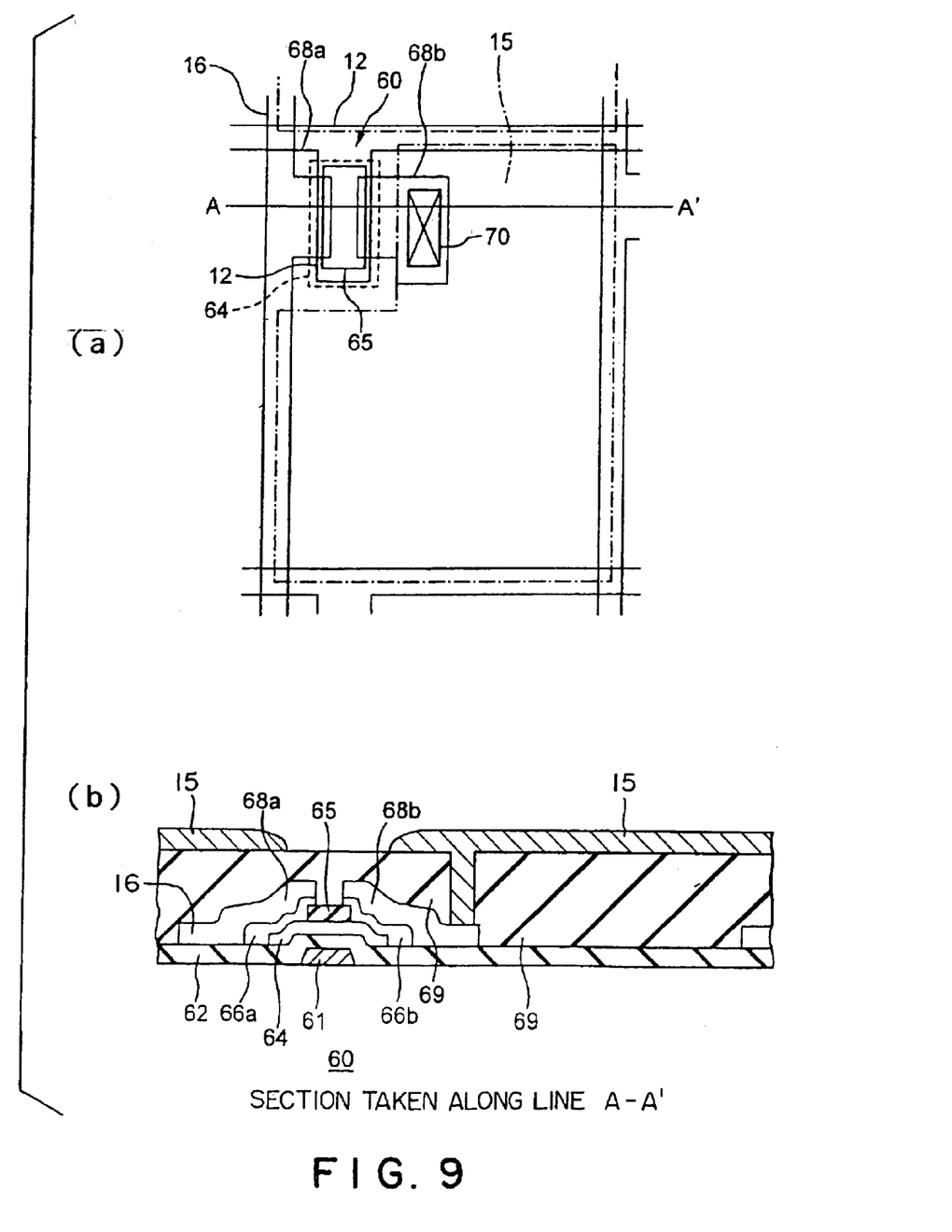
FIG. 9 is a schematic diagram for explaining the structure wherein pixels are arranged upwards.

Referring to FIGS. 8 and 9, the sixth preferred embodiment of a liquid crystal display according to the present invention will be described below. The liquid crystal display in this sixth preferred embodiment has the same construction as that of the liquid crystal display in the fourth preferred embodiment, except that switching elements 18 have a structure wherein pixels are arranged upwards, that a color filter is formed on an array substrate, and that no black matrix and no color filter are formed on a counter substrate.

The structure wherein pixels are arranged upwards is shown in FIG. 9. Gate electrodes 61 and capacitor lines (not shown) a reformed on a glass substrate constituting an array substrate. The gate electrodes 12a and the capacitor lines are covered with a gate insulating film 62 (see FIG. 9(b)). A semiconductor film 64 of an amorphous silicon serving as a channel is formed on the gate insulating film 62 so as to cover the gate electrodes 61 (see FIG. 9(b)). On the semiconductor film 64, a channel protective film 65 is formed. On the semiconductor film 64 on both sides of the channel protective film 65, sources 66a and drains 66b of an n$^+$-type amorphous silicon are formed (see FIG. 9(d)). The sources 66a and the drains 66b are connected to source electrodes 68a and drain electrodes 68b of a metal, respectively. The source electrodes 68a are connected to signal lines 16. On the source electrodes 68a and drain electrodes 68b, a color filter 69 is formed. On the color filter 69, pixel electrodes 15 of ITO are formed. The pixel electrodes 15 are electrically connected to the drain electrodes 68b via contacts 70 provided in the color filter 69.

In this preferred embodiment, no black matrix is arranged on the counter substrate, and the switching elements have the structure wherein pixels are arranged upwards. In this structure, the pixel electrodes overlap with each other on the gate lines and signal lines, so that it is possible to obtain a high aperture ratio. Similar to the fourth preferred embodiment, a smectic layer was formed by the relationship between voltages shown in FIG. 6(a). As a result, no alignment defect occurred over the whole screen, and a front contrast of 300:1 was obtained. In addition, the viewing angle (a region having a contrast of 10:1 or more and no reversal of gray scales) was 70° or more in vertical and horizontal directions, and the liquid crystal alignment and contrast were not deteriorated after driving tests at 0° C., 25° C. and 50° C. for 3000 hours.

While the TFTs 18 have been the positive TFTs in the sixth preferred embodiment, the same advantages can be obtained if negative TFTs are used.

As described above, according to the present invention, it is possible to decrease the quantity of light leaking out from the peripheral portion of pixels as small as possible, and it is possible to obtain a liquid crystal display having a high display performance.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A display device comprising:
    a liquid crystal layer having a spontaneous polarization and having a nematic phase or an isotropic phase on a high-temperature side of a chiral smectic C phase, an optical axis of liquid crystal molecules in the liquid crystal layer substantially staying when no electric field or a first electric field of a first polarity are applied to the liquid crystal layer, and the optical axis of the liquid crystal molecules responding in accordance with a magnitude of a second electric field of a second polarity different from the first polarity when the second electric field is applied to the liquid crystal layer;
    a first device facing to a side of the liquid crystal layer, including:
        a) a plurality of scanning lines formed on a first substrate,
        b) a plurality of signal lines intersecting the scanning lines,
        c) a plurality of pixel electrodes, each formed at an intersection between one of the scanning lines and one of the signal lines,
        d) a plurality of switching elements, each connected between one of the pixel electrodes and one of the signal lines, and being controlled by a signal of a corresponding one of the scanning lines, and
        e) a first alignment layer formed on the first substrate so as to cover the pixel electrodes; and a second device facing to the other side of the liquid crystal layer, including:

f) a counter electrode formed on a second substrate, and g) a second alignment layer formed on the second substrate so as to cover the counter electrode, wherein an electric field between the scanning lines and the counter electrode has the first polarity when the switching elements turn on.

2. The display device as set forth in claim 1, wherein the switching elements are disposed under the pixel electrodes.

3. The display device as set forth in claim 1, wherein a direction of a smectic layer in the liquid crystal layer has a distribution of 10° or less.

4. The display device as set forth in claim 1, wherein each of the switching elements has a negative TFT, and the first alignment layer has an alignment characteristic that the spontaneous polarization of the liquid crystal molecules is directed to the first substrate when no voltage is applied to the liquid crystal layer.

5. The display device as set forth in the claim 4, wherein the first alignment layer is made of a polyacrylonitrile or a polyimide.

6. The display device as set forth in claim 1, wherein each of the switching elements has a positive TFT, and the first alignment layer has an alignment characteristic that the spontaneous polarization of the liquid crystal molecules is directed to the second substrate when no voltage is applied to the liquid crystal layer.

7. The display device as set forth in claim 6, wherein the first alignment layer is made of a nylon or a benzocyclobutene polymer.

8. The display device as set forth in claim 1, wherein the liquid crystal molecules in the liquid crystal layer have a tilted bookshelf structure.

9. The display device as set forth in claim 1, wherein the liquid crystal molecules in the liquid crystal layer have an apparent tilt angle of substantially 22.5° or more.

10. The display device as set forth in claim 1, wherein a rubbing direction on the first alignment layer is anti-parallel to a rubbing direction on the second alignment layer.

* * * * *

UNITED STATES PATENT AND TRADEMARK OFFICE
CERTIFICATE OF CORRECTION

PATENT NO. : 6,762,812 B2
DATED : July 13, 2004
INVENTOR(S) : Hasegawa et al.

It is certified that error appears in the above-identified patent and that said Letters Patent is hereby corrected as shown below:

Title page,
Item [45], change "Jul. 13, 2004" to -- **\*Jul. 13, 2004** --.
Item [\*] Notice, after the paragraph, "Subject to any disclaimer, the term of this patent is extended or adjusted under 35 U.S.C. 154(b) by 0 days." insert:
-- This patent is subject to a terminal disclaimer. --

Signed and Sealed this

Seventh Day of December, 2004

JON W. DUDAS
*Director of the United States Patent and Trademark Office*